United States Patent Office 3,201,387
Patented Aug. 17, 1965

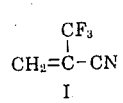
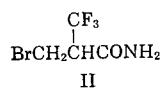
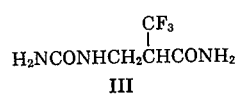
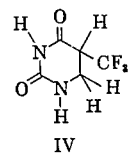
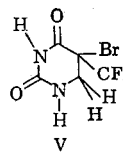
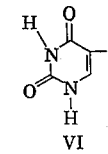
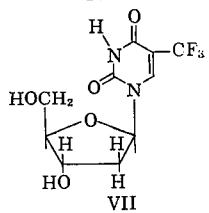

3,201,387
5 - TRIFLUOROMETHYLURACIL, DERIVATIVES THEREOF, AND PROCESSES FOR PREPARING THE SAME
Charles Heidelberger, Madison, Wis., assignor to the United States of America as represented by the Secretary of Health, Education and Welfare
Filed Sept. 18, 1963, Ser. No. 309,905
7 Claims. (Cl. 260—211.5)

This invention relates to the provision of certain new and useful uracil derivataves,, namely, 5-trifluoromethyl uracil ("trifluorothymine") and its deoxyriboside 5-trifluoromethyl-2'-deoxyuridine, and to processes for preparing the same. These materials are new fluorinated pyrimidines and nucleosides with useful biological properties.

Replacement of the hydrogen atom of carbon-5 of uracil by fluorine gives 5-fluorouracil, which is incorporated into ribonucleic acid, and inhibits the growth of murine tumors as a result of the inhibition of thymidylate synthetase by 5-fluoro-2'-deoxyuridine-5'-monophosphate.

Replacement of the same hydrogen atom by chlorine, bromine, or iodine leads to compounds that are incorporated into deoxyribonucleic acid in place of thymine.

The present invention provides replacement of the methyl group of thymine by a trifluoromethyl group thus to produce a new and useful fluorinated compound and also discloses that the new fluorinated compound may be incorporated into deoxyribonucleic acid in place of thymine to prepare a new and useful fluorinated derivative thereof. The two new compounds, 5-trifluoromethyl uracil (herein sometimes designated $F_3T$) and 5-trifluoromethyl-2'-deoxyuridine (herein sometimes designated $F_3TDR$) have useful biological properties among which are:

(1) Both compounds inhibit the growth of *Escherichia coli B*.

(2) Both compounds are high mutagenic to bacteriophage T4 in *E coli B*.

(3) Both compounds inhibit the production of bacteriophage T4 in *E coli B*.

(4) Neither compound can replace thymine in a mutant of *E coli* (15T-), which requires a thymine for growth.

(5) 5-trifluoromethyl-2'-deoxyuridine is highly cytotoxic to mammalian cells in tissue culture, having a lethal effect at about 0.2 microgram per millimeter. These cells are killed as a result of the inhibition of deoxyribonucleic acid (DNA) synthesis, while ribonucleic acid (RNA) and protein syntheses continue.

(6) 5 - trifluoromethyl-2'-deoxyuridine inhibits the cleavage of 5-fluoro-2'-deoxyuridine (FUDR) to 5-fluorouracil (FU) in a nucleoside phosphorylase preparation from Ehrlich ascites tumor cells.

(7) 5-trifluoromethyl-2'-deoxyuridine inhibits the incorporation of formate-$C^{14}$ into DNA thymine in suspensions of Ehrlich ascites tumor cells.

(8) 5-trifluoromethyl-2'-deoxyuridine, in the presence of adenosine triphosphate (ATP), inhibits the enzyme, thymidylate synthetase in crude preparations from Ehrlich ascites tumor cells.

(9) 5-trifluoromethyluracil is not toxic to mice at a dose of 250 milligrams per kilogram given by intraperitoneal injection daily for seven days. 5-trifluoromethyl-2'-deoxyuridine is not toxic to mice at a dose of 100 milligrams per kilogram given daily for seven days by intraperitoneal injection.

The invention will be best understood by initial reference to the general procedures and identification of the compounds and intermediates leading thereto in connection with the accompanying drawing, followed by more detailed quantitative examples.

The accompanying drawing is a generalized diagrammatic chart illustrating the syntheses and intermediates of the new method of the present invention producing the new compounds VI and VII of the present invention.

Referring to said drawing trifluoromethylacrylonitrile (I) dissolved in ethanol and saturated with hydrogen bromide at 5° gave β-bromo-α-trifluoromethylpropionamide (II) in 75% yield, M.P. 101–103°. (*Analysis.*—Calcd. for $C_4H_5NOF_3Br$: C, 21.84; H, 2.29; N, 6.36; F, 25.91. Found: C, 21.99; H, 2.39; N, 6.52; F, 25.77.) Condensation of this bromoamide with a 2 to 4 molar excess of urea in aqueous dioxane at 90° gave the monosubstituted urea N - (α - trifluoromethylpropionamide)-urea (III) in ca. 30% yield, M.P. 169–171°. (*Analysis.*—Calcd. for $C_5H_8N_3F_3O_2 \cdot C_2H_5OH$: C, 34.29; H, 5.72; N, 17.14; F, 23.24. Found: C, 33.87; H, 5.18; N, 17.27; F, 23.64.) On refluxing this compound in 5 N hydrochloric acid, hydrolysis of the amide group first occurred, then cyclization giving the dihydropyrimidine 5-trifluoromethyl-4,5-dihydro-2,6-dioxypyrimidine (IV) in 60% yield, M.P. 203–205° dec. (*Analysis.*—Calcd. for

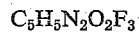

$C_5H_5N_2O_2F_3$

C, 33.00; H, 2.77; N, 15.38; F, 31.30. Found: C, 33.11; H, 28.1; N, 15.20; F, 31.26.) Treatment of (IV) in acetic acid under reflux with one mole of bromine gave the bromohydropyrimidine (V) in 70% yield, M.P. 218–221° dec., which on heating in dimethylformamide for 1 hour at 140° gave 5-trifluoromethyluracil (VI) in 85% yield, M.P. 239–241° dec. (*Analysis.*—Calcd. for $C_5H_3N_2F_3O_2$: C, 33.35; H, 1.68; N, 15.55; F, 31.65. Found: C, 33.75; H, 1.92; N, 15.40; F, 31.96), $pk_a$ (water) 7.35, (method of Shugar and Fox, Biochim. Biophys. Acta, 9, 199 (1952)). Ultraviolet absorption spectra, in 0.1 N hydrochloric acid λ max. 257 mμ, ε molar 7050; in pH 7.0 buffer, λ max. 257 mμ, ε molar 6830; in pH 8.1 buffer, λ max. 279, ε molar 6900; $R_f$, butanol/water, 86/14 v./v. ascending 0.79; butanol/acetic acid/water, 50/20/30 v./v., descending 0.80; ethyl acetate/methyl alcohol/water/n-heptane, 10/6/53 v./v., upper phase 0.76.

The 5-trifluoromethyluracil was converted quantitatively to 5-carboxyuracil in 20 minutes at room temperature in 1.0 N sodium hydroxide, and in 24 hours in 0.1 N sodium bicarbonate. The lability of the trifluoromethyl group in alkali may prove to be of some interest for chemical mutagenesis since it could be converted to a carboxyl group under conditions which would not degrade deoxyribonucleic acid.

5-trifluoromethyl-2'-deoxyuridine (VII) has been prepared using a nucleoside-phosphorylase preparation—see H. Pontis, G. Deterstedt and P. Reichard, Biochim. Biophys. Acta, 51, 138 (1961)—from Ehrlich ascites cells, and 2-deoxy-α-D-ribose-1-phosphate or by an exchange reaction with thymidine catalyzed by an enzyme obtained from *E. coli* as hereinafter exemplified. The deoxyribonucleoside was separated from the unconverted 5-trifluoromethyluracil by electrophoresis on paper in borate buffer pH 9.2, and purified by paper chromatography using a butanol/formic acid/water, 77/10/13 v./v., descending solvent system. It was obtained in an over-all yield of 8.2%, M.P. 169–172°.

*Analysis.*—Calcd. for $C_{10}H_{11}N_2O_5F_3$: C, 40.55; H, 3.73; F, 19.24. Found: C, 40.50; H, 4.15; F, 18.95. Ultraviolet absorption spectra, in 0.01 N hydrochloric acid, λmax. 260 mμ, ε molar 9590, in 0.01 N sodium hydroxide, λmax. 260 mμ, ε molar 6250; $R_f$ butanol/formic acid/water, 77/10/13 v./v., descending 0.72, ethyl acetate/methanol/water/n-heptane 10/6/5/3 v./v. descending 0.62.

The foregoing and other objects and advantages of the invention will be apparent to those skilled in the art from the foregoing discussion and from the quantitatively more detailed examples herewith set forth. The invention resides in the new methods of synthesis and the new materials herein disclosed and is more particularly pointed out in the appended claims.

EXAMPLES

For simplicity of presentation in the ensuing examples the preparations of the several starting materals which were synthesized will first be described followed by the syntheses with which the present invention is primarily concerned.

(1) *Preparation of Trifluoromethyl Acrylonitrile*—M. W. Buxton, M. Stacey and J. C. Tatlow, J. Chem. Soc., 366, (1954)

A solution of 300 g. of trifluoroacetone (obtainable commercially) (2.68 moles), in 600 ml. of water containing 140 g. of sodium cyanide (2.85 moles) was cooled in an ice bath to 5° C. and 1000 ml. of 6 N sulfuric acid added dropwise to the stirred mixture over a period of 3 hours. The reaction temperature was maintained at 5–10° C. After allowing the mixture to stand at room temperature overnight, the crude trifluoroacetone cyanohydrin was separated, and the aqueous solution which remained was extracted three times with 300 ml. of ether. After combining the crude trifluoroacetone cyanohydrin and the ether extracts, the mixture was washed twice with 300 ml. of water and dried with anhydrous magnesium sulfate. The ether was then distilled at atmospheric pressure, and the residue fractionally distilled in vacuo. The fraction boiling between 65° and 75° C. at 100 mm. contained the trifluoroacetone cyanohydrin. The yield was 310 g. (83%).

Three hundred and ten grams of trifluoroacetone cyanohydrin (2.33 mole) was acetylated with 400 ml. of acetic anhydride (4.12 moles) containing 0.5 ml. of sulfuric acid. After refluxing for 30 minutes the product was allowed to cool to room temperature and stand overnight. Water was then added to react with the excess acetic anhydride and the resulting solution poured into 1200 ml. of crushed ice. The acetate which separated was removed and the aqueous layer extracted three times with 400 ml. of ether. The acetate was combined with the ether extracts, and after washing with water, was dried with anhydrous magnesium sulfate, and the product fractionally distilled at atmospheric pressure. The fraction boiling from 120° to 145° contained a mixture of acetic acid and the acetylated trifluoroacetone cyanohydrin. This was shaken with water and the acetate which separated was removed, dried and combined with the rest of the crude acetylated cyanohydrin. This was fractionally distilled and the material boiling in the range 145–154° was collected. Yield of acetylated trifluoroacetone cyanohydrin, 330 g. (85%).

The acetylated acetone cyanohydrin 330 g. (1.83 moles) was pyrolyzed in a slow stream of nitrogen, by passing the vapor through a tube 32 cm. long and 1.7 cm. in diameter packed with pieces of glass tubing 1 cm. x 0.2 cm. at 520–530° C. The time required to pyrolyze the 330 g. was 7 hours, the products of the reaction being condensed in a trap kept at 0°. This mixture was then carefully fractionally distilled. The fraction boiling between 72 and 79° contained the trifluoromethylacrylonitrile. Yield 167 g. (76%).

A solution of α-trifluoromethyl acrylonitrile (31.35 g. or .259 m.) and anhydrous methanol (8.38 g., .262 m.) was cooled for an hour in an ice bath. Gaseous anhydrous HBr (43.9 g.) was then bubbled in slowly until the theoretical amount (42.4 g.=.524 m.) was absorbed (1–2 hr.).

The viscous mixture was left in the refrigerator for 48 hrs., and at the end of this time excess HBr was removed on the water pump at room temperature.

With a vacuum still being drawn, the reaction mixture was then swirled in a water bath preheated to 90–100° until the melt was clear and no further evolution of gaseous products could be observed. The melt was cooled then ground in a mortar with a small amount of ice water. The white powder was filtered with suction and dried in a vacuum desiccator over $CaSO_4$ and KOH. Concentration of the aqueous wash in vacuo at 32° yielded a further amount of the desired product.

*Crude product:* 40.7 g. (78.5%).—The low yield is due to losses resulting from too high a vacuum during the thermal decomposition of the amino ester hydrobromide.

The thoroughly dried crude product may be further purified, with 93% recovery by sublimation at 80%/1 mm., M.P. 104–106°.

(2) *Preparation of N-acetylurea*—Werner J. Chem Soc. 109, 1120 (1916)

Into a tube 19.5 cm. x 2.4 cm. was placed 5.0 g. (0.0834 mole) of urea and 11.0 ml. (0.116 mole) of acetic anhydride, 2.0 ml. of acetic acid containing 0.2 ml. of concentrated sulfuric acid was then added. The mixture was then cautiously warmed with continuous stirring in an oil bath. When the temperature had reached 90° a spontaneous reaction set in, and the temperature was maintained at 90°–95° without further heating. After 8 minutes when the mixture began to cool the tube was warmed to 120° for 5 minutes to complete the reaction. During the reaction the N-acetyl-urea began to crystallize, and on cooling the reaction mixture set to a solid mass, 20 ml. of water was added and the lumps broken up. After 3 hours at 3° the product was collected after filtration and washing with ice cold water. The N-acetylurea was recrystalized from water and obtained as colorless needles 6.3 g. (74%). Chromatograms run in butanol/water 86/14 of the N-acetylurea and developed with $AgNO_3$/NaOH showed one component $R_F$ 0.56. A chromatogram run on the mother liquor showed the major by-product to be diacetylurea $R_F$ 0.72, a little of the N-acetylurea was also present. No unchanged urea was observed. Neither N-acetylurea or diacetylurea were satisfactorily detected using the Fink spray (p-dimethylamino benzaldehyde).

(3) *Condensation of N-acetylurea with β-bromo-α-trifluoromethyl propionamide*

The bromoamide 7.0 g. (0.032 mole) and the N-acetylurea 3.5 g. (0.034 mole) were dissolved by warming in 25 ml. of dimethylformamide and the mixture was heated for 3 hours at 120°. The dimethylformamide was then evaporated in vacuo at 65° and the residue was recrystallized from water after being decolorized with charcoal. 3.6 g. was obtained from the first crop, and 0.49 from the second crop. Yield 52% M.P. 226–228°.

(4) *Cyclization of the (N-acetylureido)-α-trifluoromethyl propionamide*

4.0 g. of the N-acetylureido amide was heated for 2 hours in 20 ml. of 5 N HCl at 120°. After cooling, the hydrochloric acid was removed in vacuo at 40° and the crude dihydro pyrimidine obtained was decolorized with charcoal and recrystallized from water. Yield of the 5,6-dihydro-5-trifluoromethyluracil 1.49 (46%). It melted with decomposition at 203–205°. (Analysis.— Calcd. for $C_5H_5N_2O_2F_3$. C, 33.0; H, 2.77; N, 15.4; F, 31.3: Found C, 33.11, H, 2.81; N, 15.2; F, 31.26).

(5) *Preparation of 5-trifluoromethyluracil (IV)*

To a solution of 2.0 g. of 5,6-dihydro-5-trifluoromethyluracil (0.011 mole) in 20 ml. of glacial acetic acid was added dropwise 2.0 g. of bromine (0.015 mole) while heated under reflux. After refluxing for 2 hours, excess bromine, and the acetic acid were removed, and the residue evaporated several times with ethanol and finally with water, then recrystallized from water. Plates of the 5,6-bromohydro-5-trifluoromethyluracil, M.P. 224–228° (dec.) were obtained. Yield 2.15 g. (75%). The bromohydropyrimidine (810 mg.) dissolved in 8 ml. of dimethylformamide was heated at 135–145° for 60 minutes, the dimethylformamide was then evaporated off under reduced pressure to give an oil. The oil obtained was co-evaporated with water and a brown crystalline mass obtained. This was redissolved in water, decolorized with charcoal, and crystallized from 20 ml. of water. The 5-trifluoromethyluracil was obtained as colorless needles M.P. 239–243° (dec.). Yield 447 mg. (81%). (Analysis.—Calcd. for $C_5H_3N_2F_3O_2$: C, 33.3; H, 1.68; N, 15.55; F, 31.65: Found C, 33.75; H, 1.92; N, 15.40; F, 31.96) $pk_a$ (water) 7.35, ultraviolet absorption spectra, in 0.1 N hydrochloric acid λ max. 257 m$\mu$, ε molar 7050; in pH 7.0 buffer λ max. 257 m$\mu$, ε molar 6830; in pH 8.1 buffer λ max. 279 m$\mu$, ε molar 6900. $R_F$ butanol/water 86/14 v./v. ascending 0.79; butanol/acetic acid/water 50/20/30 v.v. descending 0.80; ethylacetate/methyl alcohol/water/n-heptane 10/6/53 v./v. upper phase 0.76.

*5-carboxyuracil.*—A solution of 10 mg. of 5-trifluoromethyluracil in 1.0 ml. of 1.0N sodium hydroxide was allowed to remain at room temperature for 3 hours, and then the products of the reaction were washed through a Dowex-50 (H+) column (5 cm. x 1 cm.) with water. All the 260 m$\mu$ absorbing material was eluted in the first 25 ml. and this was concentrated to 2 ml. Chromatography in the butanol/formic acid/water 77/10/13 v./v. system showed only one U.V. absorbing compound $R_F$ 0.37, authentic 5-carboxyuracil run on the same chromatogram gave an $R_F$ of 0.38. The eluate also showed the same U.V. spectra as 5-carboxyuracil in both acid and alkaline solution. The concentrated solution on standing overnight deposited crystals, these were centrifuged, washed with a little cold water and dried; they melted at 297° (with rapid heating). The melt decomposed with bubbling the resolidified giving presmatic crystals of uracil which melted at 328–330° (dec.). Authentic 5-carboxyuracil melts at 300° with decomposition giving uracil. The recovery of 5-carboxyuracil was 81°. In another experiment it was found that a solution of 5-trifluoromethyluracil in 0.1 M sodium bicarbonate was quantitatively converted to 5-carboxyuracil in 24 hours at room temperature.

(6) *Preparation of 5-trifluoromethyl-2'-deoxyuridine and isolation by ion- exchange chromatography*

Three liters of medium containing 5.0 gm. of sodium chloride per liter and 10 gm. of Bactotryptone (Difco) per liter were inoculated with a culture of *E. coli B* and incubated at 37° C. for approximately 10 hours. The cells were harvested and washed once with 0.067 M potassium hydrogen phosphate buffer, pH 6.45. The collected cells were resuspended in 50 ml. of the above phosphate buffer and were passed through a French hydraulic press two times. The resulting solution was centrifuged at 9000×g. for 15 minutes and the supernatant was carefully decanted from the cellular debris. This crude enzyme preparation retained its activity for more than two to three months when stored in a frozen state.

A solution prepared by dissolving 1.05 g. (4.5 mmoles) of thymidine and 0.210 g. (1.16 mmoles) of 5-trifluoromethyluracil in 150 ml. of 0.067 M phosphate buffer, pH 6.7, was treated with 15 ml. of the *E. coli* extract, and incubated for 3 hours at 38° C. The protein in the digest was then denatured and coagulated by heating for 3 minutes at 90° in a boiling water bath. This crude protein was removed by centrifugation and the supernatant solution was evaporated to dryness in vacuo at 40°. The residue was then extracted with eight 50 ml. portions of absolute alcohol, boiling each time for 5 minutes; this treatment removed all but a trace of the U.V. absorbing material from the inorganic salts. The combined ethanolic tract was then evaporated to dryness and redissolved in 10 ml. of water. This neutral solution was then applied to a Dowex-1 (formate) column (30 cm. x 4 cm.) which had previously been equilibrated with 0.1 M ammonium formate adjusted to pH 7.7 with ammonia, and elution continued with this solution. Thymidine, closely followed by thymine, were eluted in the first 500 ml., and no more U.V. absorbing material was obtained until the pH of the buffer solution was reduced to 5.5 when the 5-trifluoromethyl-2'-deoxyuridine was eluted. The pH 5.5 buffer was prepared by adding 5 N ammonia to 0.1 N formic acid until the desired pH was obtained. The 5-trifluoromethyl=2'-deoxyuridine which was eluted in a total volume of 1200 ml. was evaporated to dryness at 35° in vacuo, and then re-evaporated twice with absolute ethanol. The dry residue was then extracted five times with 30 ml. portions of warm ethyl acetate, and the combined extracts evaporated in vacuo to an oil which solidified with crystallization. This solid was re-extracted with ethyl acetate, filtered and evaporated to dryness to give 49.0 mg. of 5-trifluoromethyl-2'-deoxyoxidine. (Yield 14.2%), pH 1.0, λ max. 260 m$\mu$, ε molar 96–70. Chromatography in the "heptane system" showed only one component $R_F$ 0.60. The "heptane system" is the upper phase of a two-phase mixture obtained by mixing ethyl acetate (10 parts), methyl alcohol (6 parts), water (5 parts), and n-heptane (3 parts).

The Dowex-1 (formate) column when eluted with 0.1 M formic acid gave the unchanged 5-trifluoromethyluracil and a small amount of 5-carboxyuracil which had been formed from the 5-trifluoromethyluracil, possibly when being absorbed on to the column at pH 7.7.

Publication has been made of the usbject matter of the present invention within the year next preceding the execution of the present specification as follows:

Jou. Amer. Chem. Soc. 84, 3597, Sept. 20, 1962 and the disclosure in said publication is made a part hereof by reference and may be consulted for further details and comments on the invention.

The invention described herein is assigned to the Government of the United States and it is prayed that the present application be accorded fee-exempt status in accordance with the Opinion of the Comptroller General No. B–111,648 (96 USPQ 453; 98 USPQ 238 and Sec. 607.01 M.P.E.P.).

I claim:
1. A compound of the formula

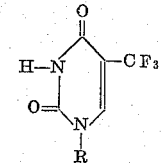

wherein R is selected from the group consisting of hydrogen and the radical

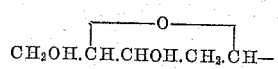

2. 5-trifluoromethyluracil.
3. 5-trifluoromethyl-2'-deoxyuridine.
4. The method of preparing a fluorinated derivative of uracil which comprises:
(a) reacting trifluoromethylacrylonitrile with hydrogen bromide to produce the bromoamide β-bromo-α-trifluoromethylpropionamide,
(b) condensing the bromoamide produced by step (a) with a molar excess of aurea to form the N-substituted urea N-(α-trifluoromethylpropionamide)-urea,
(c) subjecting the N-substituted urea produced by step (b) to hydrolysis of the amide group and to cyclization to produce the dihydropyrimidine 5-trifluoromethyl-4,5-dihydro-2,6-dioxypyrimidine, (d) reacting the dihydropyrimidine produced by step (c) with bromine to form the bromohydropyrimidine 5 - trifluoromethyl-5-bromo-4-hydro-2,6-dioxypyrimidine, and (e) subjecting the bromohydropyrimidine to heating to produce 5-trifluoromethyluracil.

5. The method of claim 4, further comprising the steps (f) incorporating the 5-trifluoromethyluracil produced by step (e) into deoxyribonucleic acid and (g) recovering the deoxyriboside formed in step (f).

6. The method of claim 4, further comprising the steps (f) reacting the 5-trifluoromethyluracil produced by step (e) with 2-deoxy-α-D-ribose-1-phosphate with the aid of nucleoside phosphorylase, and (g) recovering the 5-trifluoromethyl-2'-deoxyuridine formed in step (f).

7. A method as claimed in claim 5, wherein step (f) is effected by an exchange reaction with thymidine catalyzed by enzyme obtained from *E. coli*.

References Cited by the Examiner

UNITED STATES PATENTS

| | | | |
|---|---|---|---|
| 2,948,725 | 8/60 | Duschinsky et al. | 260—260 |
| 2,949,451 | 8/60 | Hoffer | 260—260 |

OTHER REFERENCES

Giner-Sorolla et al.: J.A.C.S., vol. 80, Nov. 5, 1958, pp. 5744–5752

Heidelberger et al: "J. Amer. Chemi. Soc.," vol. 84, Sept. 20, 1962, pp. 3597–3598.

LEWIS GOTTS, *Primary Examiner*